United States Patent
Gunyakti et al.

(10) Patent No.: US 7,278,131 B2
(45) Date of Patent: *Oct. 2, 2007

(54) COMPACT HARDWARE IDENTIFICATION FOR BINDING A SOFTWARE PACKAGE TO A COMPUTER SYSTEM HAVING TOLERANCE FOR HARDWARE CHANGES

(75) Inventors: Caglar Gunyakti, Sammamish, WA (US); Ferdinand Jay Alabraba, Seattle, WA (US); Aidan T. Hughes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

This patent is subject to a terminal disclaimer.

(21) Appl. No.: 10/378,294

(22) Filed: Mar. 3, 2003

(65) Prior Publication Data
US 2004/0177354 A1 Sep. 9, 2004

(51) Int. Cl.
*G06F 9/44* (2006.01)
(52) U.S. Cl. ........................ 717/107; 717/121
(58) Field of Classification Search ........ 717/120–122, 717/168–178, 106–107; 711/126, 216

See application file for complete search history.

(56) References Cited

U.S. PATENT DOCUMENTS

| | | | |
|---|---|---|---|
| 6,044,471 A | 3/2000 | Colvin | 713/202 |
| 6,148,407 A | 11/2000 | Aucsmith | 713/202 |
| 6,226,747 B1 | 5/2001 | Larsson et al. | 713/200 |
| 6,243,468 B1 | 6/2001 | Pearce et al. | 380/250 |
| 6,785,825 B2 | 8/2004 | Colvin | 713/202 |
| 2001/0044782 A1 | 11/2001 | Hughes et al. | 705/59 |
| 2004/0177168 A1* | 9/2004 | Alabraba et al. | 710/1 |

FOREIGN PATENT DOCUMENTS

EP 0 679 980 A1 11/1995
EP 0 707 270 A1 4/1996

OTHER PUBLICATIONS

Fully Licensed Paper, "Inside Windows Product Activation", Fully Licensed GmbH, Germany, www.licenturion.com, pp. 1-10, Jul. 2001.*

* cited by examiner

*Primary Examiner*—Ted T. Vo
(74) *Attorney, Agent, or Firm*—Merchant & Gould P.C.; Ryan T. Grace

(57) ABSTRACT

Systems and methods for generating a-compact hardware identification (CHWID) for a given computer system are disclosed. The compact hardware identification (CHWID) may be used to control the use of software on the given computer system depending on the degree of hardware changes to the computer system. The compact hardware identification (CHWID) may be electronically transmitted over limited bandwidth media, such as a telephone.

58 Claims, 10 Drawing Sheets

COMPACT HARDWARE IDENTIFICATION FOR BINDING A SOFTWARE PACKAGE TO A COMPUTER SYSTEM HAVING TOLERANCE FOR HARDWARE CHANGES

FIELD OF THE INVENTION

The present invention relates to systems and methods for generating a compact hardware identification (CHWID) for a given computer system. The compact hardware identification (CHWID) may be used to control the use of software on the given computer system depending on the degree of hardware changes to the computer system. The compact hardware identification (CHWID) may be electronically transmitted over limited bandwidth media, such as a telephone.

BACKGROUND OF THE INVENTION

There has been considerable effort in recent years to prevent or minimize the unlawful use of computer software. Due to its reproducibility and ease of distribution, piracy of computer software and illegal use of computer software beyond the scope of a license agreement are common occurrences, which significantly hurt software manufacturers.

Methods have been developed in an effort to reduce the occurrences of computer software piracy and illegal use of computer software beyond the scope of a license agreement. However, such methods often cause problems for legitimate software purchasers and users in the form of consumer inconvenience. For instance, a user who has upgraded his/her computer should be able to legitimately reinstall the software product on the upgraded machine. However, presently available methods may either (i) not allow the software to be installed, or (ii) force the user (who is now disgruntled) to call the software manufacturer for assistance.

Accordingly, there remains a need for improved technology solutions to piracy and illicit use, but which also recognize and accommodate the needs and practices of a legitimate software purchaser and user.

SUMMARY OF THE INVENTION

The present invention addresses some of the difficulties and problems discussed above by the discovery of an improved hardware identification for a computer system. The hardware identification of the present invention provides a method of minimizing or preventing software piracy and the illegal use of computer software beyond the scope of a license agreement, while allowing for machine upgrades by legitimate software users.

The hardware identification of the present invention, referred to herein as a "compact hardware identification" (CHWID), identifies (1) a number of component classes typically used to build a hardware configuration for a computer system, and (2) a single component device or instance within a given component class for a particular computer system. By taking into account a single component device or instance within a select number of component class, a secure and reliable compact hardware identification (CHWID) for a particular computer system is generated, while enabling a degree of tolerance for component changes to the hardware configuration of the particular computer system.

The compact hardware identification (CHWID) may be used when a limited amount of space is available to identify a particular hardware configuration when initially loading a software product onto a computer. The compact hardware identification (CHWID) may be stored for future use, such as (i) when the same software product is launched on the same computer or a variation of the same computer, or (ii) when the same software product is reloaded onto a variation of the same computer or a completely different computer. For example, when the same software product is launched on the same computer or a variation of the same computer, a second compact hardware identification (sCHWID) is generated and compared to (1) a previously stored compact hardware identification (iCHWID), or (2) a previously stored verbose hardware identification (VHWID) described below. If a desired number of matches exist between component classes of the second compact hardware identification (sCHWID) and corresponding component classes of either (1) the previously stored compact hardware identification (iCHWID), or (2) the previously stored verbose hardware identification (VHWID), the method of the present invention allows the software product to be launched. However, if a desired number of matches do not exist between component classes of the second compact hardware identification (sCHWID) and corresponding component classes of either (1) the previously stored compact hardware identification (iCHWID), or (2) the previously stored verbose hardware identification (VHWID), the method of the present invention will not allow the software product to be launched due to changes to the original hardware system beyond a desired threshold.

Accordingly, the present invention is directed to a compact hardware identification (CHWID), and a method of generating a compact hardware identification (CHWID). The present invention is further directed to a method for preventing the use of software on a computer system if an attempt to launch the software product generates a new compact hardware identification (CHWID), which is out of tolerance when compared to either (1) a previously stored compact hardware identification (iCHWID), or (2) a previously stored verbose hardware identification (VHWID) due to one or more hardware changes to the original computer system.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to a method for identifying a hardware configuration of a given computer system by a compact hardware identification (CHWID). The present invention is also directed to a method of generating a compact hardware identification (CHWID) by identifying a single component instance within each of a selected number of component classes. The present invention is further directed to a method of using a compact hardware identification (CHWID) to determine whether a software product can be used on a computer hardware configuration.

The compact hardware identification (CHWID) may be generated for a computer system comprising a variety of hardware components. An exemplary computer system may comprise a number of hardware components, which are grouped into classes including, but not limited to, hard disk drives, optical disk drives network cards, display adapters, read only memory (ROM), random access memory (RAM), and a basic input/output system (BIOS). An exemplary computer system and exemplary operating environment for practicing the present invention is described below.

Exemplary Operating Environment

Figure 1:
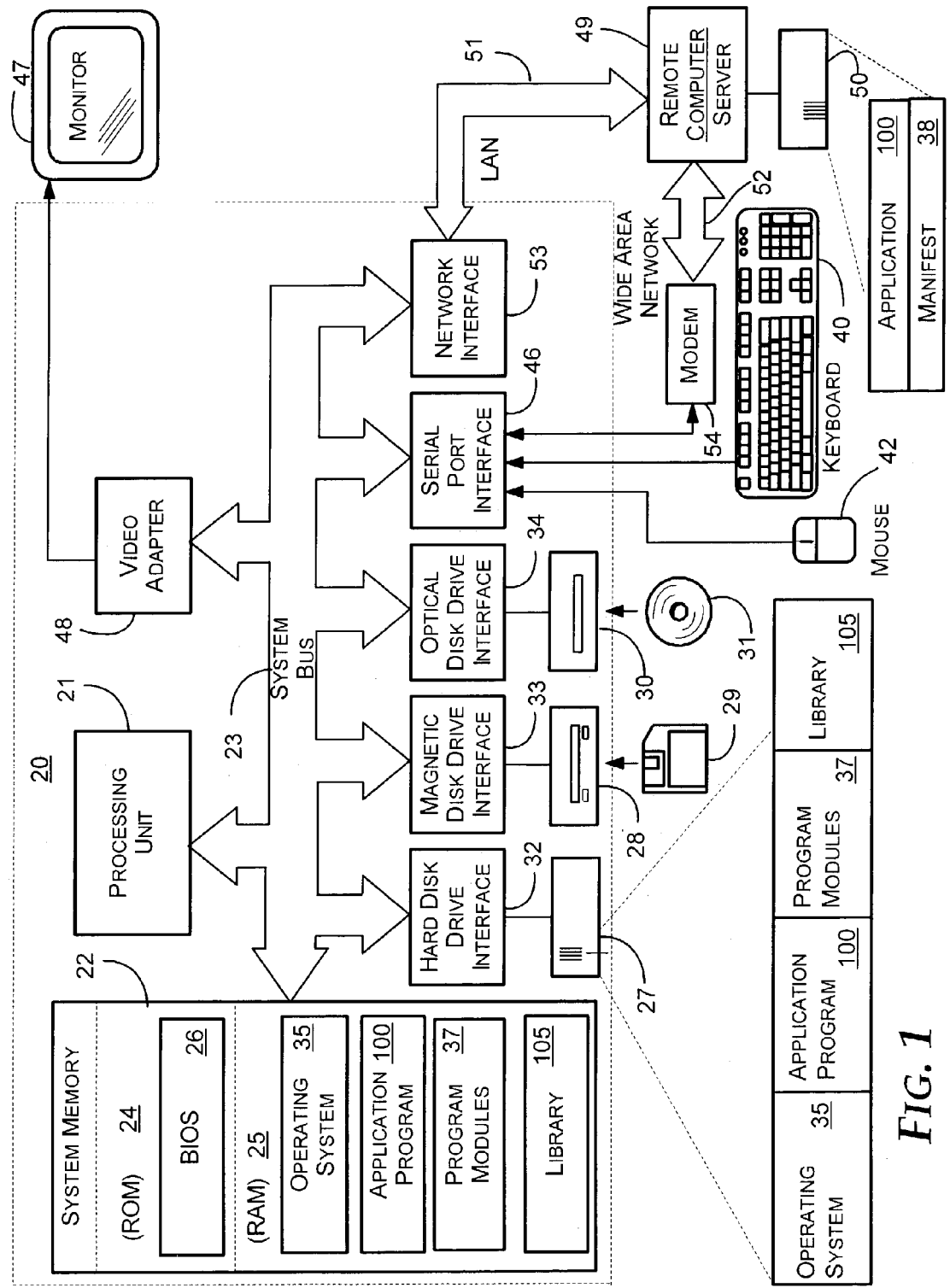
FIG. 1 is a flow diagram of some of the primary components of an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media, which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 (not shown) may be stored in the RAM 25 and/or hard drive 27 of the personal computer 20.

A number of program modules may be stored on hard disk 27, magnetic disk 29, optical disk 31, ROM 24, or RAM 25, including an operating system 35, an application program module 36, other program modules 37, and program data 38. Program modules include, but are not limited to, routines, sub-routines, programs, objects, components, data structures, etc., which perform particular tasks or implement particular abstract data types. Aspects of the present invention may be implemented as an integral part of an application program module 36 or as a part of another program module 37.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A monitor 47 or other type of display device may also be connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to personal computer 20, only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, personal computer 20 is connected to local area network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The present invention may also be practiced in distributed computing environments, where tasks are performed by remote processing devices that are linked through a communications network. In a distributed computing environment, program modules may be located in both local and remote memory storage devices.

Implementation of Exemplary Embodiments of the Present Invention

As described above, a computer system typically comprises multiple classes of hardware components. Further, the computer system may comprise multiple components (e.g., two disk hard drives) within each class of hardware components.

The compact hardware identification (CHWID) of the present invention takes into account a single component device (also referred to herein as an "instance") within each desired class of hardware components used to determine the CHWID. The compact hardware identification (CHWID) of the present invention may also take into account the absence of a component device within a given component class of a computer hardware system. For example, a determination of the component classes to be used to identify a given computer hardware configuration may be made prior to examining the given computer hardware configuration. The computer hardware configuration may or may not contain a component instance for each of the selected component classes used to produce the compact hardware identification (CHWID) of the computer hardware configuration.

An exemplary method of the present invention for generating a compact hardware identification (CHWID) is given below. Further, an exemplary method of the present invention for using the compact hardware identification (CHWID) as an anti-pirating tool is also described below.

I. Generating A Compact Hardware Identification (CHWID) For A Computer System

A description of the components of an exemplary compact hardware identification (CHWID) is given below.

A. The Compact Hardware Identification (CHWID)

The compact hardware identification (CHWID) of a given computer system desirably comprises two distinct parts: (1) an optional version component and (2) a hash component. Each of the possible compact hardware identification (CHWID) parts may be derived from the hardware configuration of a given computer system. An example of a computer hardware configuration and the instances within each component class is shown in FIG. 2.

Figure 2:
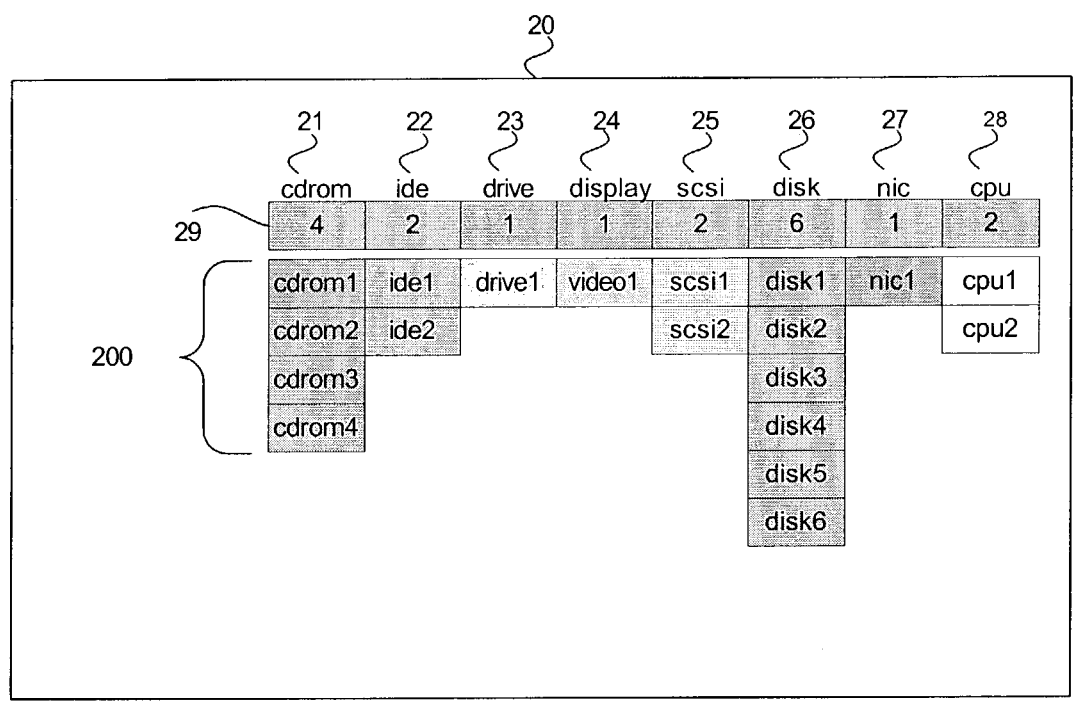
FIG. 2 depicts an exemplary hardware configuration containing eight component classes and a total of 19 component devices or instances distributed within the eight component classes.

As shown in FIG. 2, the exemplary computer hardware configuration 20 comprises 8 distinct component classes 21–28 having a total of 19 component instances 200 distributed among component classes 21–28. CDRom component class 21 contains 4 component instances; IDE component class 22 contains 2 component instances; drive component class 23 contains 1 component instance; display component class 24 contains 1 component instance; SCSI component class 25 contains 2 component instances; disk component class 26 contains 6 component instances; network card component class 27 contains 1 component instance; and processor (i.e., cpu) component class 28 contains 2 component instances. Row 29 in FIG. 2 depicts a string of numbers, which represent the number of component instances within each of the 8 component classes 21–28.

It should be noted that the number of component instances within a given component class may vary from 0 to as many as required to represent a given hardware configuration, although an implementation may arbitrarily limit the number of component instances per component class. Typically, a given hardware configuration contains from 0 to about 6 component instances per component class. As described below, even when a component class does not contain a component instance, the absence of a component instance within the component class contributes a piece of information, which is incorporated into the compact hardware identification (CHWID).

Figure 3:
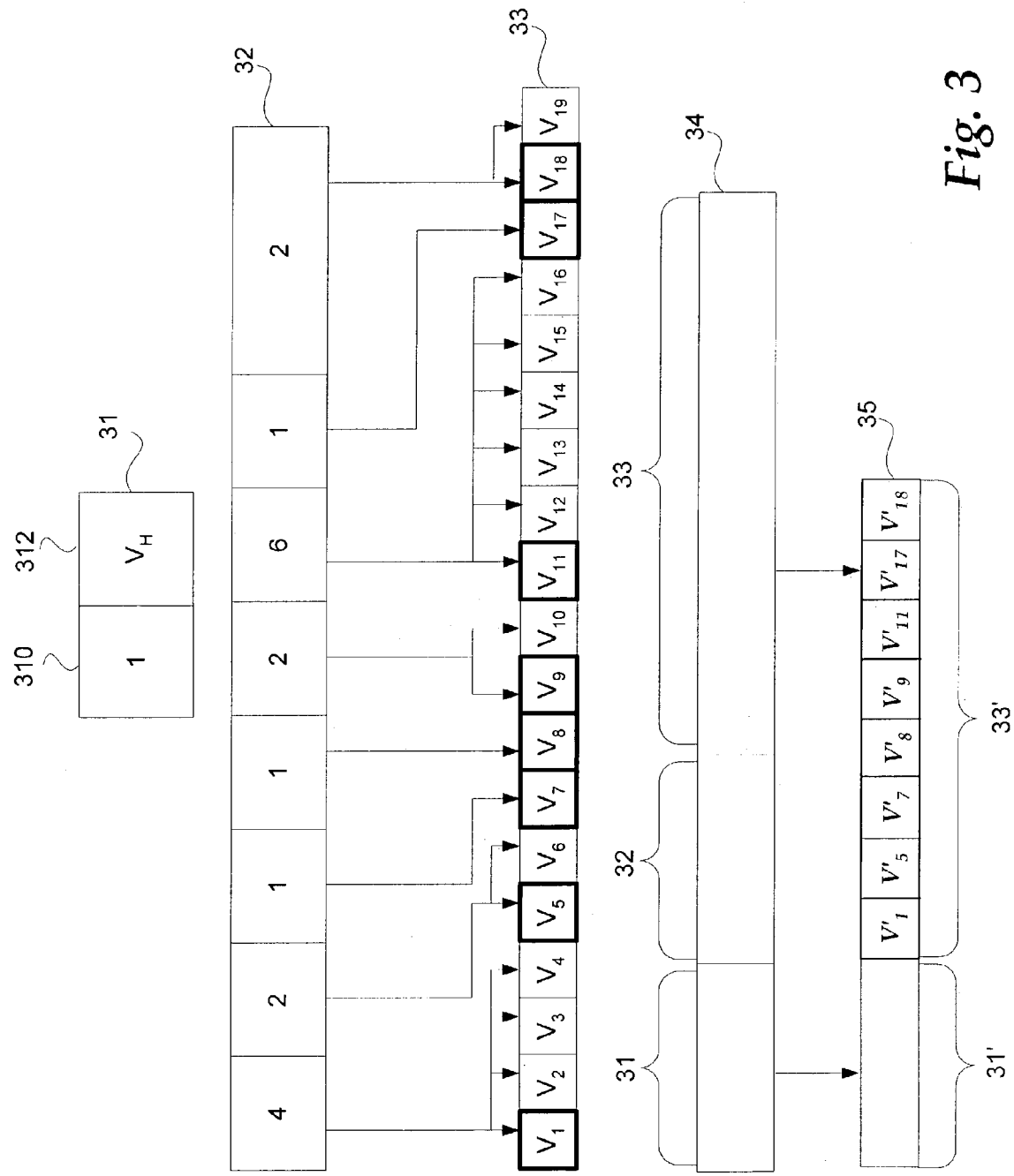
FIGS. 3 depicts one possible verbose hardware identification (VHWID) and a corresponding compact hardware identification (CHWID) for the exemplary hardware configuration shown in FIG. 2.

An exemplary compact hardware identification (CHWID) is shown in FIG. 3. The exemplary compact hardware identification (CHWID) 35 of FIG. 3 is one possible way to identify the computer hardware configuration shown in FIG. 2. As discussed above, the compact hardware identification (CHWID) 35 desirably comprises two separate components: version component 31' and hash portion 33'. Each of the two separate portions of compact hardware identification (CHWID) 35 is depicted in FIG. 3.

Version component 310 of header portion 31 identifies a particular version of the verbose hardware identification (VHWID) 34 and its corresponding compact hardware identification (CHWID) 35 used to identify a given computer system. For example, a particular version (e.g., version "1") of a verbose hardware identification (VHWID) or compact hardware identification (CHWID) may vary from another version (e.g., version "2") of a verbose hardware identification (VHWID) or compact hardware identification (CHWID) by using one set of parameters to create version 1, while using a separate, different set of parameters to create version 2. A variety of parameters may be used to create a given version of a verbose hardware identification (VHWID) and its corresponding compact hardware identification (CHWID). Suitable parameters include, but are not limited to, (1) the number of component classes represented in the compact hardware identification (CHWID) 35; (2) the maximum and/or minimum number of component classes used to create verbose hardware identification (VHWID) 34; (3) the maximum and/or minimum number of component instances to be considered within a given VHWID component class; (4) the first hash function used to produce hash values for each component instance in the verbose hardware identification (VHWID) 34; (5) the length of each hash result used to form the verbose hardware identification (VHWID) 34; (6) the maximum length of the verbose hardware identification (VHWID) 34; (7) the maximum and/or minimum number of component class hash results used to create the compact hardware identification (CHWID) 35; (8) the second hash function used to produce second hash values for each component instance; (9) the length of each second hash result used to form the compact hardware identification (CHWID) 35; and (10) the maximum length of the compact hardware identification (CHWID) 35.

Some component classes cannot have multiple component instances and are known as single-instance classes. Total system RAM is one example of a single-instance class. The data for a single-instance class is hashed and truncated if necessary, then stored in the truncated numerical portion 312 of the header part 31. Each single-instance class represented in the header will have an associated truncated numerical portion 312.

Desirably, version component 31' of compact hardware identification (CHWID) 35 has a fixed length, which is consistent for all compact hardware identifications having a particular version type (e.g., version 1 CHWIDs).

Count portion 32 comprises a string of n numbers, which represent the number of component instances within each of the n component classes used to prepare the verbose hardware identification (VHWID) 34. As shown in FIG. 3, count portion 32 comprises the string of numbers: "4 2 1 1 2 6 1 2", which corresponds to the component instances within component classes 21–28 shown in FIG. 2. It should be noted that if a component class does not contain a component instance, count portion 32 contains a "0" for the particular component class.

Hash portion 33 used to create verbose hardware identification (VHWID) 34 comprises a concatenated string of first hash values representing each of the 19 component instances within component classes 21–28 shown in FIG. 2. Each separate hash result may have a length of up to about 160 bits. Desirably, each separate hash result has a length of from about 10 to about 20 bits, more desirably, about 16 bits.

Hash portion 33 of verbose hardware identification (VHWID) 34 typically has a length, which varies depending upon the number of component instances within n component classes of a given hardware configuration. The total length of hash portion 33 is equal to the number of component instances times the desired hash result length for each component instance hash result. In this example, the resulting hash portion 33 of verbose hardware identification (VHWID) 34 has a desired total length of 304 bits (i.e., 19×16=304).

Hash portion 33' of compact hardware identification (CHWID) 35 differs from hash portion 33 used to create verbose hardware identification (VHWID) 34. In one exemplary embodiment of the present invention, hash portion 33' of compact hardware identification (CHWID) 35 comprises one component instance second hash value per component class, resulting from a second hash function performed on one component instance first hash value per component class. The component instance first hash value is selected from one or more of then component classes used to create hash portion 33 of verbose hardware identification (VHWID) 34. The method of choosing component instance first hash values within hash portion 33 to be further processed through a second hash function may be (i) by a random selection procedure or (ii) by a predetermined method. One exemplary predetermined method comprises selecting the first instance within each component class as shown in FIG. 3.

The resulting hash portion 33' of compact hardware identification (CHWID) 35 comprises a concatenated string of component instance second hash values ($v'_x$) resulting from performing a second hash function on select component instance first hash values of hash portion 33. Each separate component instance second hash value may have a length of up to about 16 bits. Desirably, each separate component instance second hash value has a length of up to about 8 bits, more desirably, from about 3 to about 6 bits. Component instance second hash values ($v'_x$) are shown in FIG. 3 and are derived by performing a second hash function on the following string of first hash values: $v_1$, $v_5$, $v_7$, $v_8$, $v_9$, $v_{11}$, $v_{17}$ and $v_{18}$ to produce component instance second hash values: $v'_1$, $v'_5$, $v'_7$, $v'_8$, $v'_9$, $v'_{11}$, $v'_{17}$ and $v'_{18}$.

Hash portion 33' of compact hardware identification (CHWID) 35 typically has a length of less than about 64 bits. The length of hash portion 33' may vary depending upon (i) the number of component instance first hash values used to create hash portion 33', and (ii) the second hash value length for each individual component instance second hash value.

As shown in FIG. 3, verbose hardware identification (VHWID) 34 may be represented by a concatenated string of header portion 31, count portion 32 and hash portion 33. Similarly, compact hardware identification (CHWID) 35 may be represented by a concatenated string of version component 31' and hash portion 33'. An exemplary method of determining a verbose hardware identification (VHWID) 34 and a compact hardware identification (CHWID) 35 for a computer hardware configuration is described below.

It should be noted that the compact hardware identification (CHWID) of the present invention may only comprise one of the above-described portions. In one exemplary embodiment of the present invention, the compact hardware identification (CHWID) 35 of a given computer hardware configuration comprises hash portion 33' alone. In this embodiment, the compact hardware identification (CHWID) 35 does not contain version component 31'.

Regardless of the components used to create compact hardware identification (CHWID) 35, compact hardware identification (CHWID) 35 desirably has a total length of less than about 256 bits. In one exemplary embodiment of the present invention, compact hardware identification (CHWID) 35 has a total length of from about 32 bits to about 64 bits.

B. Determining A Verbose Hardware Identification (VHWID) For A Computer System

Figure 4:
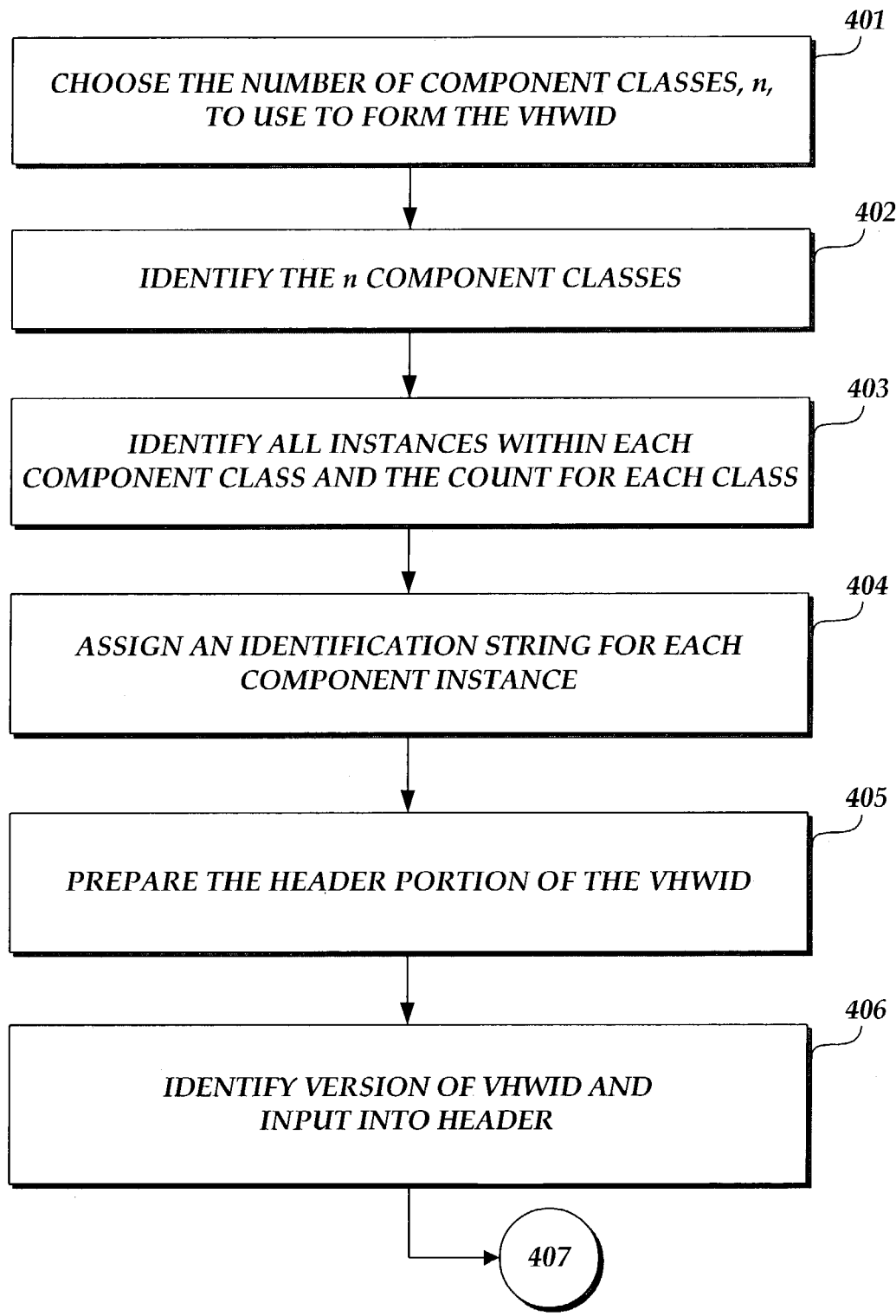
FIGS. 4–8 are a flow diagram showing exemplary steps in determining a compact hardware identification (CHWID) for a hardware configuration.
Figure 5:
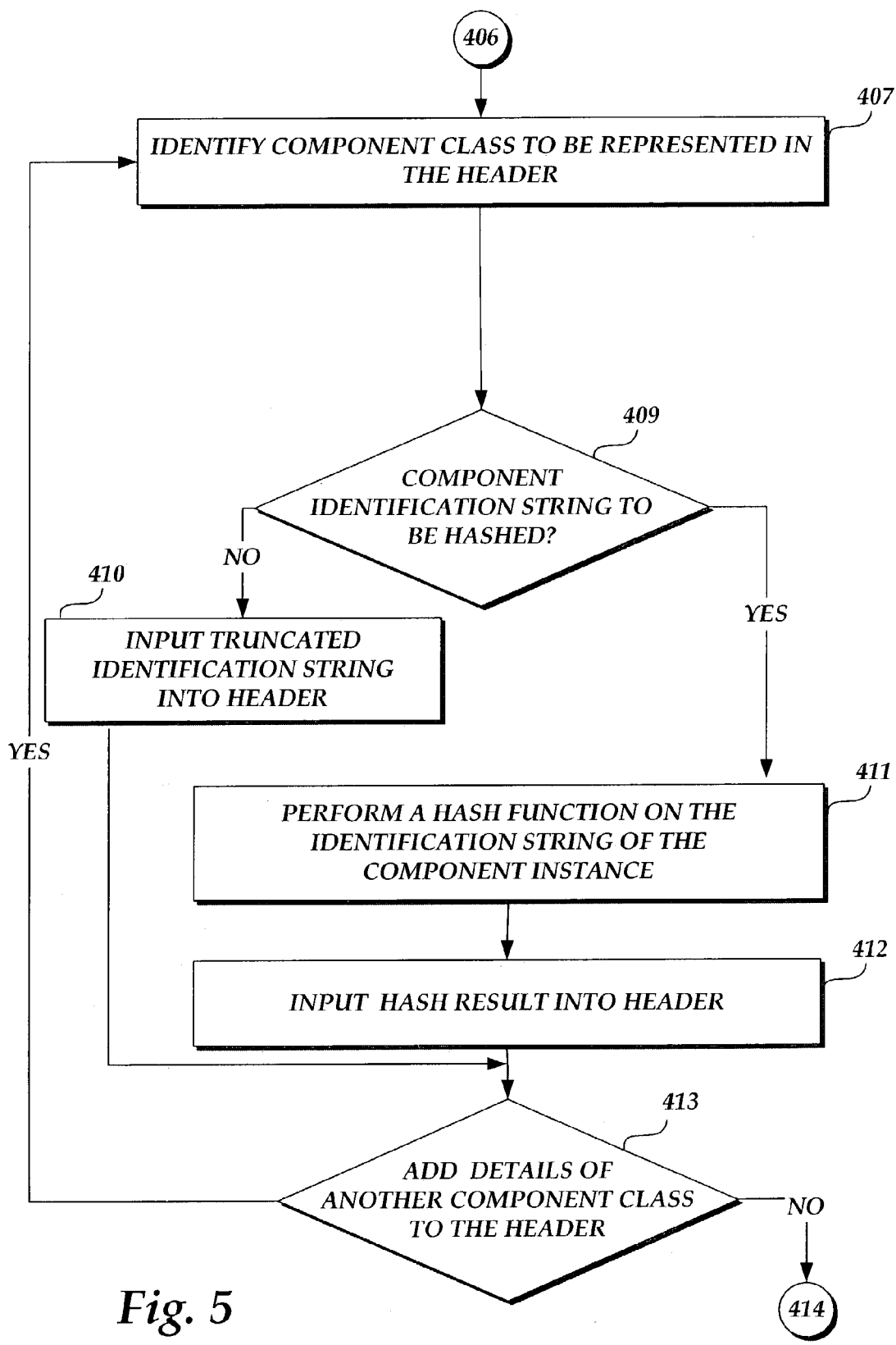
Figure 6:
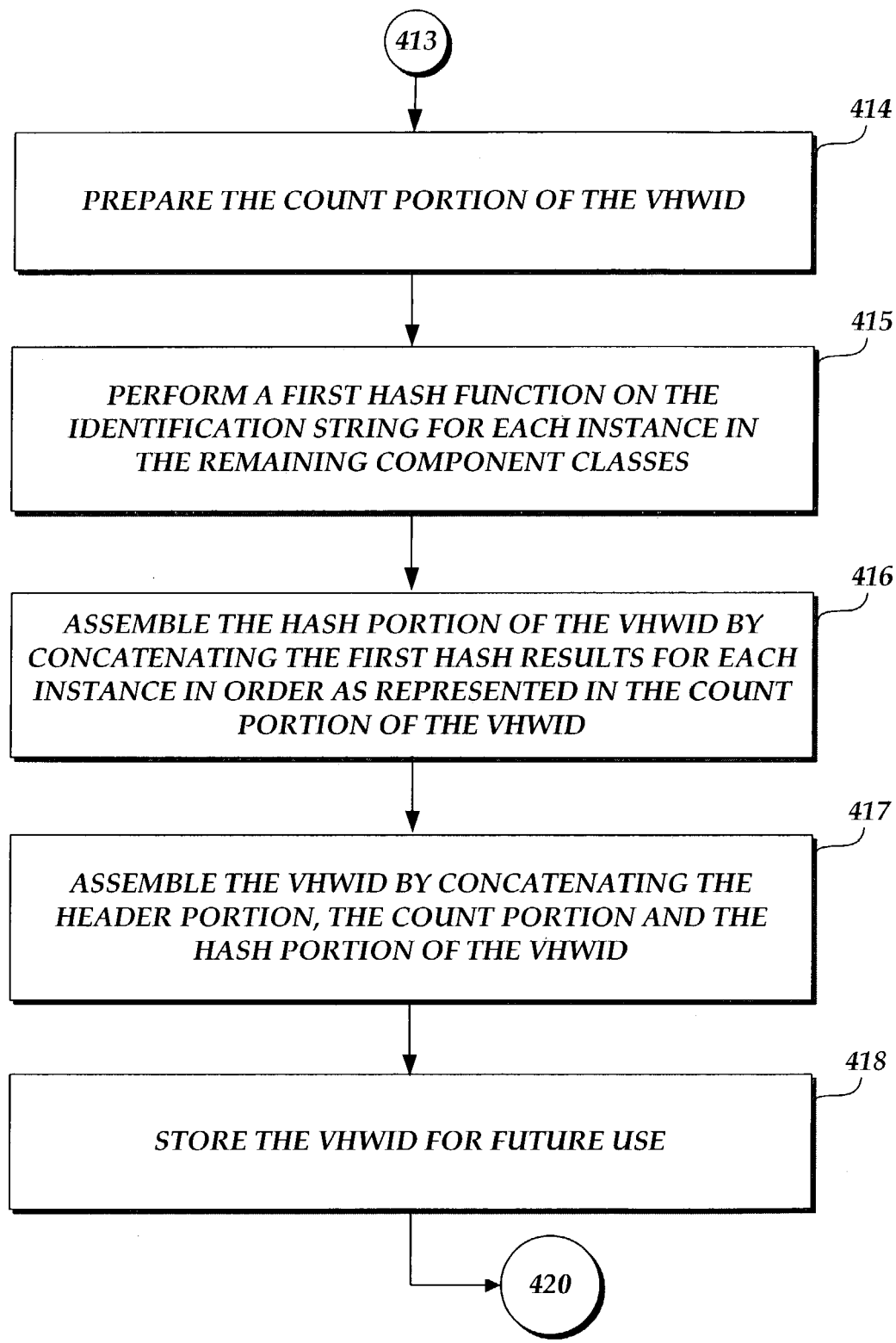

The VHWID of the present invention may be determined by an exemplary method as shown in FIGS. 4–6. The steps of the exemplary method may be performed by software code within a software product on a customer's computer, similar to computer 20 described above with reference to FIG. 1. As shown in FIGS. 4–6, an exemplary determination of a VHWID for a given computer hardware configuration (referred to herein as "HW1") begins with step 401, wherein a number of component classes, n, is chosen to identify a given computer hardware configuration HW1. As discussed above, a given computer system may include a variety of hardware components and classes of hardware components. Exemplary hardware component classes include, but are not limited to, hard disk drives, logical disk partitions, optical disks, network cards, display adapters, read only memory (ROM), random access memory (RAM), IDE devices, sound cards, video cards, processors, SCSI devices and the system BIOS. Desirably, n, the number of hardware component classes, is a whole number ranging from about 2 to about 16. In general, it is desirable for n to be as large as possible in order (i) to more precisely identify a given computer system, and (ii) to more accurately measure the degree of tolerance of a given computer system.

After choosing the number of component classes, n, in step 401, each component class is identified in step 402. The component classes may include any of the above-described component classes such as the class of disk hard drives. An exemplary list of component classes used to identify sample hardware configuration HW1 is given below in Table 1.

TABLE 1

Exemplary List of Hardware Component Classes Used To Identify Sample Hardware Configuration HW1

| omponent Class No. | Class Description | Class Identifier |
|---|---|---|
| 1 | CdRom | CdRom device identifier |
| 2 | IDE devices | IDE device identifier |
| 3 | Hard Disk Drive | Drive partition serial number |
| 4 | Display adapter device | Identifier |

TABLE 1-continued

Exemplary List of Hardware Component Classes Used To Identify Sample Hardware Configuration HW1

| Component Class No. | Class Description | Class Identifier |
|---|---|---|
| 5 | SCSI devices | SCSI device identifier |
| 6 | Disk Devices | Disk device identifier |
| 7 | Network Card | MAC address |
| 8 | Processors | Processor device identifier |

As shown in Table 1, in this example, n equals 8, and the identified hardware component classes include: (1) a CdRom class; (2) an IDE devices class; (3) a drive class; (4) a display adapter device class; (5) a SCSI device class; (6) a disk class; (7) a network card class; and (8) a CPU processor class.

After each component class is identified in step 402, all devices or instances within each hardware component class are identified in step 403. The "count" (i.e., the number of component devices or instances within each component class) is also determined in step 403. Desirably, each instance within a particular component class is identified by the most unique identification string associated with the instance. For example, the hardware configuration may contain a CdRom manufactured by NEC Corporation and having an identification string of "NEC CDRW24 S15." Any available method for determining the most unique identification string of a given instance may be used in the present invention. The step of assigning an identification string for each component instance is shown in step 404.

Once an identification string for each component instance is assigned, the header portion of the verbose hardware identification (VHWID) is prepared in step 405. In step 406, a particular version of the verbose hardware identification (VHWID) is inputted into the header to form header portion 310 (as shown in FIG. 3). As described above, the version number may represent one or more parameters used to determine the verbose hardware identification (VHWID) and its corresponding compact hardware identification (CHWID).

In step 407, a component class to be represented in the header is identified. Typically, component classes capable of having only a single component instance, or single instance classes, are represented in the header portion of the VHWID. Suitable component classes, which may be represented in the header portion of the VHWID, included, but are not limited to, a memory component class, a computer dockability component class (i.e., whether the computer is dockable or not), the system BIOS, or a combination thereof. In one exemplary embodiment of the present invention, the header portion of the VHWID comprises information from a single component class of the hardware configuration.

From step 407, the method proceeds to decision block 409. At decision block 409, a decision is made as to whether the identification string of the component instance used to form a portion of the header is subjected to a hashing function. The identification string may be subjected to a hash function or truncated to a desired number of bits. Although not shown in FIG. 5 as an option, it should be noted that the identification string could be used verbatim as long as the identification string has less than a desired maximum of characters, typically less than about 16 bits.

If the identification string is to be subjected to a hash function, the method proceeds to step 411, wherein a hash function is performed on the identification string of the component instance and truncated to a desired bit length. Desirably, the hash result is truncated to a length of about 16 bits. In step 412, the truncated hash result is inputted into the truncated numerical portion 312 of header portion 31 (as shown in FIG. 3). If the identification string is not subjected to a hash function, the method proceeds to step 410, where the identification string is truncated to a desired length and inputted into the truncated numerical portion 312 of header portion 31. Desirably, the identification string is truncated to a length of less than about 16 bits.

Once a truncated hash result from step 412 or a truncated identification string from step 410 is inputted into truncated numerical portion 312 of header portion 31, the method proceeds to decision block 413. At decision block 413, a decision is made whether to add details of another component class to header portion 31 of the VHWID. If additional details of another component class are to be added to the header portion 31 of the VHWID, the method returns to step 407 and proceeds as described above. If no further information is to be added to the header portion 31 of the VHWID, the method proceeds to step 414, where the count portion 32 of the VHWID is prepared. As discussed above, the count portion 32 of the VHWID comprises a numerical string of n numbers, which represent the number of component instances within each of the n component classes used to form the VHWID. (See count portion 32 of FIG. 3.)

In step 415, a first hash function is performed on the identification strings for each component instance represented in the count portion 32 of the VHWID. If a given component class does not contain a component instance, a special first hash result may be generated for use in the VHWID, wherein the special first hash result indicates that a given component class did not contain a component instance. Alternatively, no first hash value may be stored and the part of count potion 32 corresponding to the missing component class will be set to zero, indicating that the component class is absent. The first hash results for each component instance may be truncated to a desired length. In one exemplary embodiment of the present invention, each of the first hash function results are truncated to a length of from about 10 to about 20 bits, more desirably, about 16 bits.

Any known hash functions may be used in the present invention as long as the hash function is capable of accepting an identification string of arbitrary length and producing a hash output or result having a fixed length of less than about 160 bits. Examples of suitable hash functions include, but are not limited to, hash function algorithms HAVAL, MD2, MD4, MD5, and SHA-1, all of which are known to those of ordinary skill in the art. Suitable hash functions and a description thereof may be found in *Applied Cryptography* by Bruce Schneier, published by John Wiley & Sons (ISBN #0471117099), the disclosure of which is incorporated herein in its entirety.

In one embodiment of the present invention, a "salt value" may be added to the component instance identifier prior to performing the first hash function for a given component instance. In this embodiment, adding a salt value enables the production of different VHWIDs based on the same computer hardware configuration. Different VHWIDs for the same hardware configuration may be beneficial when running different applications or different passes. One example of a situation where different VHWIDs for the same hardware configuration may be beneficial is discussed below.

For example, if a user activates multiple software packages from the same vendor, it may be possible to use the VHWID to relate the separate activation records to build a picture of the software purchasing habits of the user. To guard against this, different VHWIDs from the same machine may be made to appear unrelated by constructing each separate hash using a hash function such as $hash_x = MD5[(salt\ value)_x + ID\ string]$ where the salt value is different for each software package.

In step 416, the first hash results for each component instance are concatenated to form hash portion 33 of verbose hardware identification (VHWID) 34 (as shown in FIG. 3). In step 417, the final verbose hardware identification (VHWID) 34 is assembled by concatenating header part 31, count part 32, and hash part 33.

In step 418, the resulting verbose hardware identification (VHWID) for hardware configuration HW1 is stored for future use. The verbose hardware identification (VHWID) for hardware configuration HW1 may be stored locally (e.g., in the registry, file system, or secure store), at an accessible remote location (e.g., database), or transmitted to a clearinghouse server for license acquisition.

Although the exemplary method described above produces a verbose hardware identification (VHWID) containing header part 31, count part 32, and hash part 33, in some embodiments of the present invention, the verbose hardware identification (VHWID) for hardware configuration HW1 may only contain (i) hash portion 33 alone or (ii) count part 32 in combination with hash portion 33, such as a VHWID comprising count part 32 concatenated with hash portion 33.

C. Determining A Compact Hardware Identification (CHWID) For A Computer System

Figure 7:
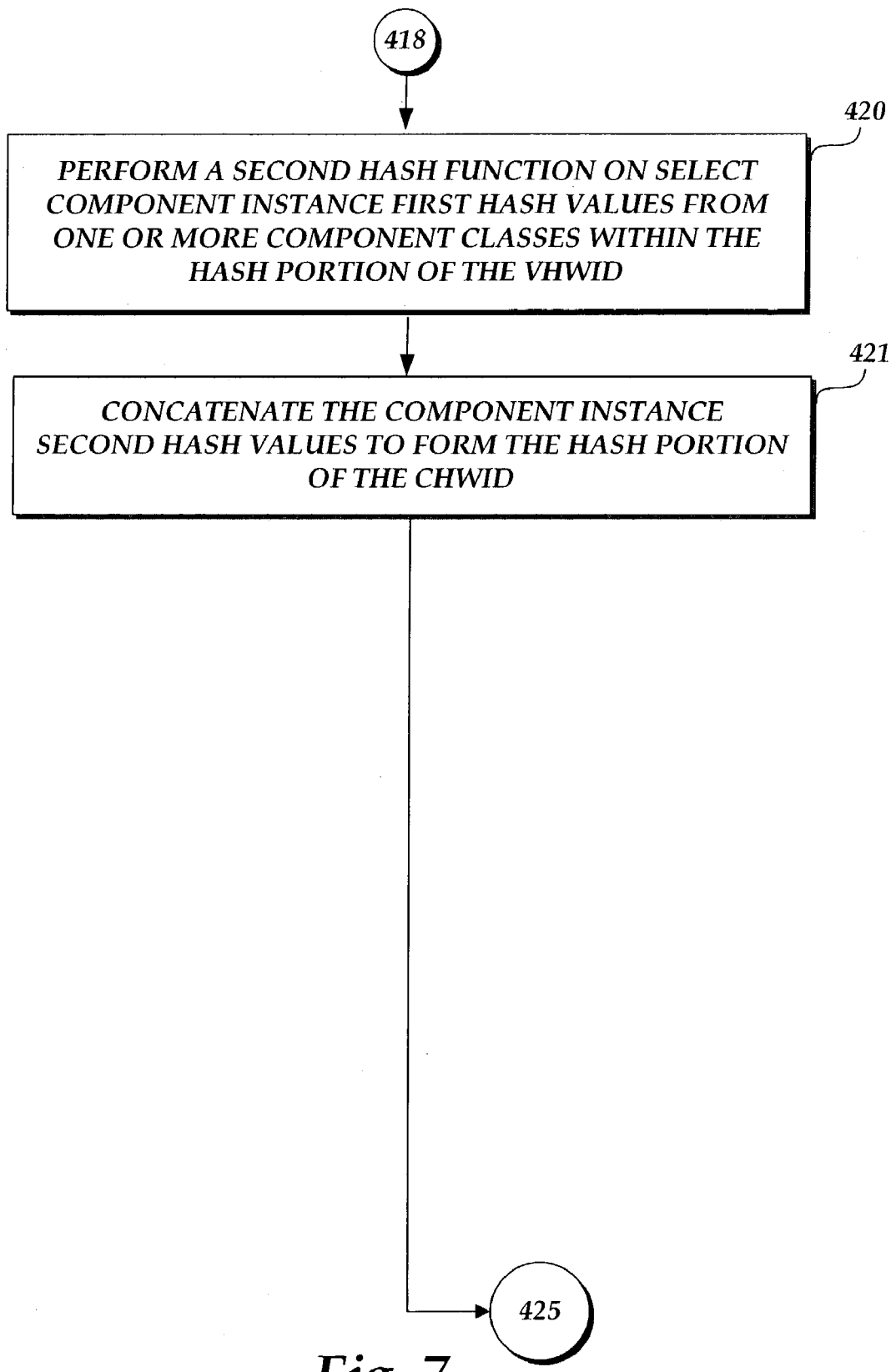
Figure 8:
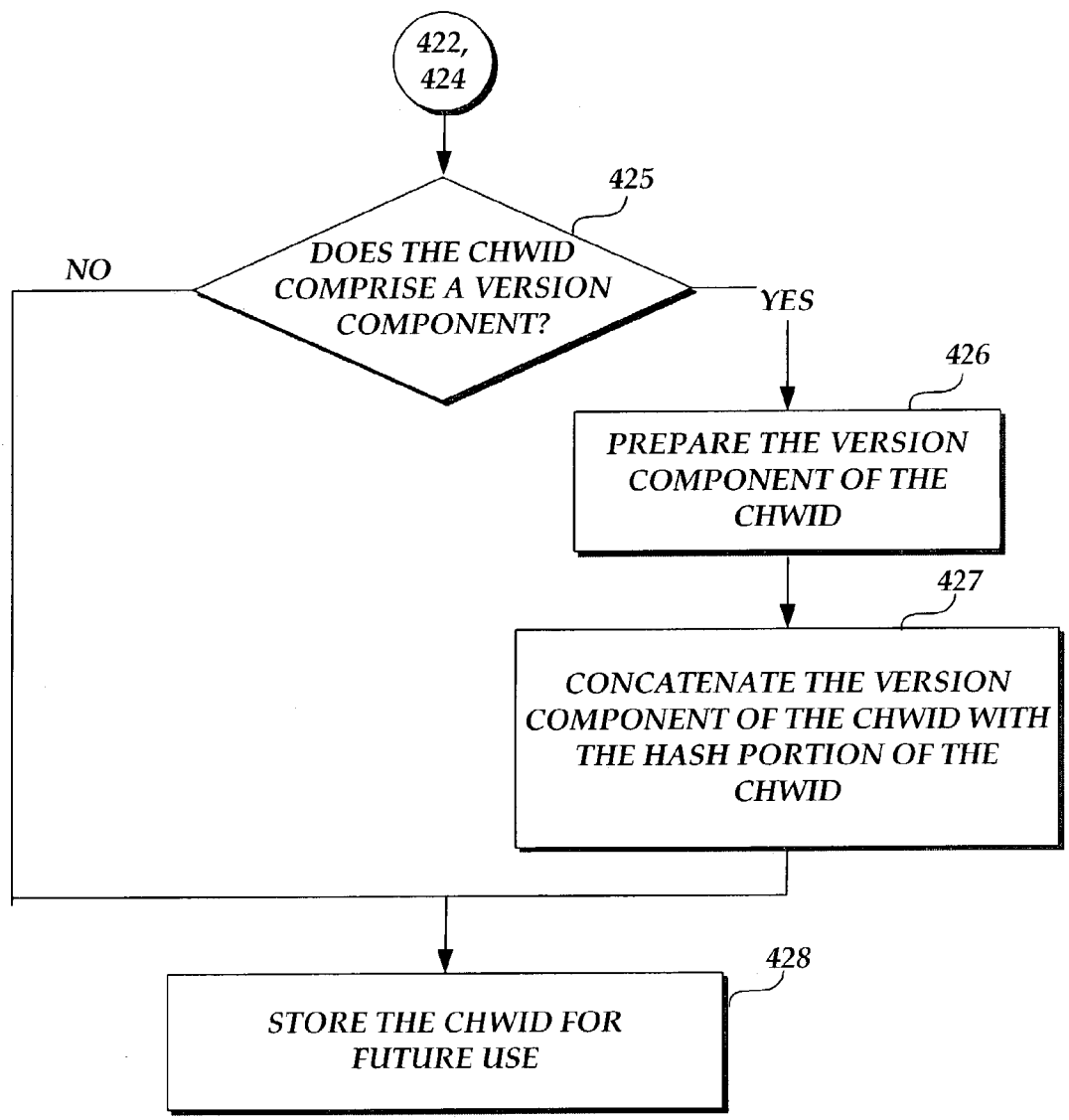

The compact hardware identification (CHWID) of the present invention may be determined by as shown in FIGS. 7–8. The steps of the exemplary method for forming the compact hardware identification (CHWID) may be performed by software code within a software product on a customer's computer, similar to computer 20 described above with reference to FIG. 1. As shown in FIGS. 7–8, the exemplary method for forming one possible compact hardware identification (CHWID) for hardware configuration HW1 begins with step 420.

In step 420, a second hash function is performed on one component instance first hash value from each of the q component classes selected from one or more component classes, n, used to create hash portion 33 of verbose hardware identification (VHWID) 34. As described above, the second hash function may be performed on one or more component instance first hash values, wherein the method of selecting component instance first hash values from one or more of the n component classes is accomplished via (i) a random selection procedure or (ii) a predetermined method. Desirably, one component instance first hash value is selected from at least (n−5) component classes, more desirably, from at least (n−3) component classes, even more desirably, from at least (n−2) component classes. In one exemplary embodiment of the present invention, one component instance first hash value is selected from all of the n component classes to form corresponding component instance second hash values.

As with the first hash function used to form the hash portion 33 of verbose hardware identification (VHWID) 34, any known hash function may be used in the present invention as long as the hash function is capable of accepting a component instance first hash value of up to about 160 bits and producing a component instance second hash value having a fixed length of less than about 32 bits. Examples of suitable second hash functions include, but are not limited to, hash function algorithms HAVAL, MD2, MD4, MD5, and SHA-1, all of which are known to those of ordinary skill in the art as discussed above.

In one embodiment of the present invention, a "salt value" may be added to the component instance first hash value prior to performing the second hash function for a given component instance first hash value. In this embodiment, adding a salt value enables the production of different compact hardware identifications (CHWIDs) based on the same computer hardware configuration. Different compact hardware identifications (CHWIDs) for the same hardware configuration may be beneficial when running different applications or different passes. One example of a situation where different CHWIDs for the same hardware configuration may be beneficial is discussed below.

For example, if a user activates multiple software packages from the same vendor, it may be possible to use the CHWID to relate the separate activation records to build a picture of the software purchasing habits of the user. To guard against this, different CHWIDs from the same machine may be made to appear unrelated by constructing each separate hash using a hash function such as $hash_x = MD5[(salt\ value)_x + ID\ string]$ where the salt value is different for each software package.

In step 421, the component instance second hash values are concatenated to form hash portion 33' of compact hardware identification (CHWID) 35 (as shown in FIG. 3).

In step 427, the version component 31' of the compact hardware identification (CHWID) is concatenated with the hash portion 33' of the compact hardware identification (CHWID) to form the final compact hardware identification (CHWID) for hardware configuration HW1. The method then proceeds to step 428. Returning to decision block 425 described above, if the compact hardware identification (CHWID) does not comprise a version component 31', the method proceeds directly to step 428.

In step 428, the resulting compact hardware identification (CHWID) for hardware configuration HW1 is stored for future use. The compact hardware identification (CHWID) for hardware configuration HW1 may be stored locally (e.g., in the registry, file system, or secure store), or at an accessible remote location (e.g., database) as described below.

As discussed above, in some embodiments of the present invention, the compact hardware identification (CHWID) for hardware configuration HW1 may only contain hash portion 33'.

II. Using A Compact Hardware Identification (CHWID) To Enable The Use of A Software Product on A Computer System The present invention is further directed to a method of using a compact hardware identification (CHWID) to enable the use of a software product on a computer system having a given computer hardware configuration. In one embodiment of the present invention, the method of using a compact hardware identification (CHWID) to enable the use of a software product on a computer system having a given computer hardware configuration is initiated (i) during any installation of the software product on a computer other than an initial installation, (ii) during launching of a software product or application already existing on a component of a computer hardware configuration, or (iii) both. An exemplary method for using the compact hardware identification (CHWID) is described in FIGS. 9–10. The steps of the exemplary method may be performed by software code within a software product on a customer's computer, similar to computer 20 described above with reference to FIG. 1.

Figure 9:
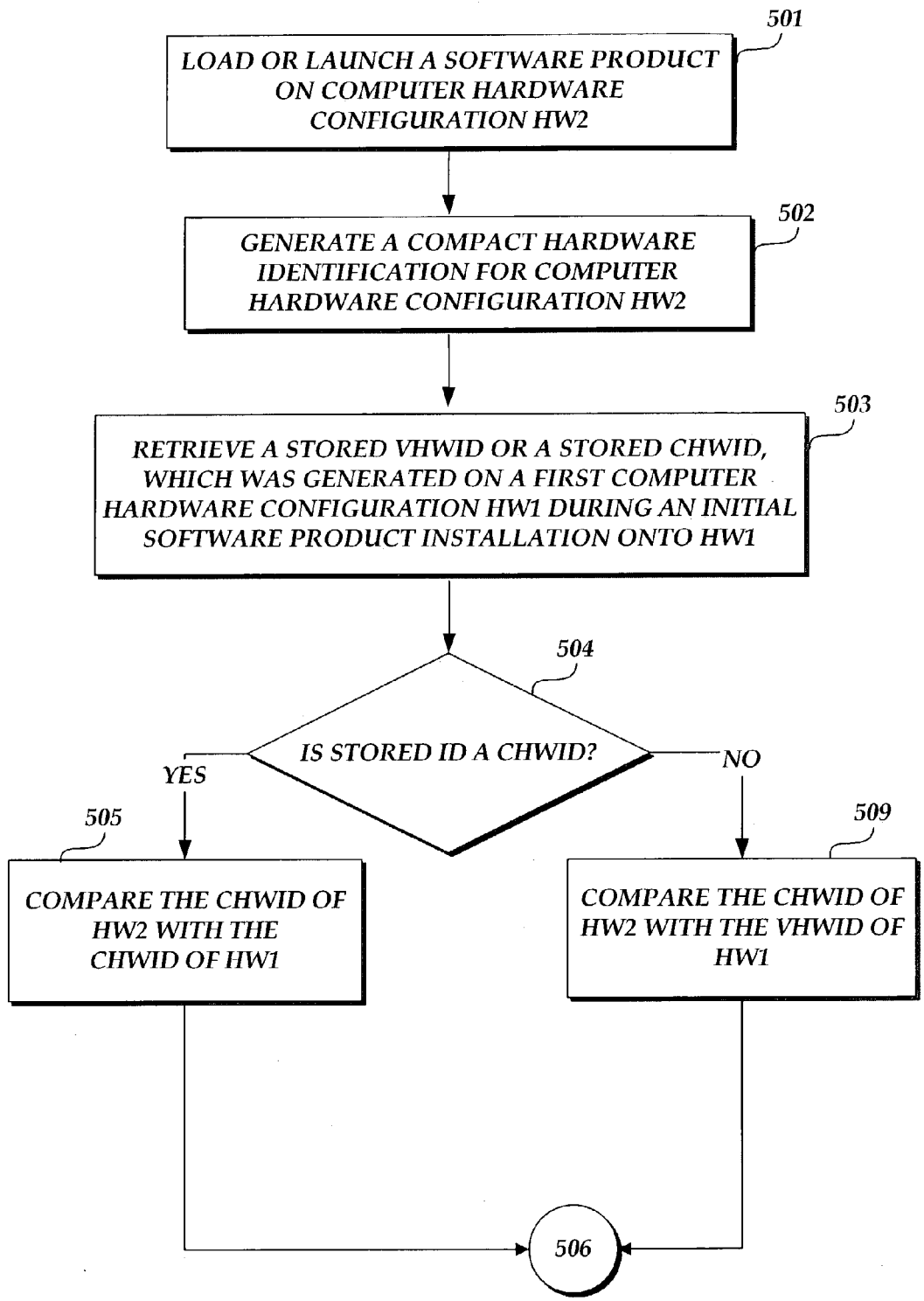
FIGS. 9–10 are a flow diagram showing exemplary steps in determining whether a software product can be used on a computer hardware system by comparing a newly generated compact hardware identification (CHWID) to either (1) a previously stored compact hardware identification (iCH-WID), or (2) a previously stored verbose hardware identification (VHWID).
Figure 10:
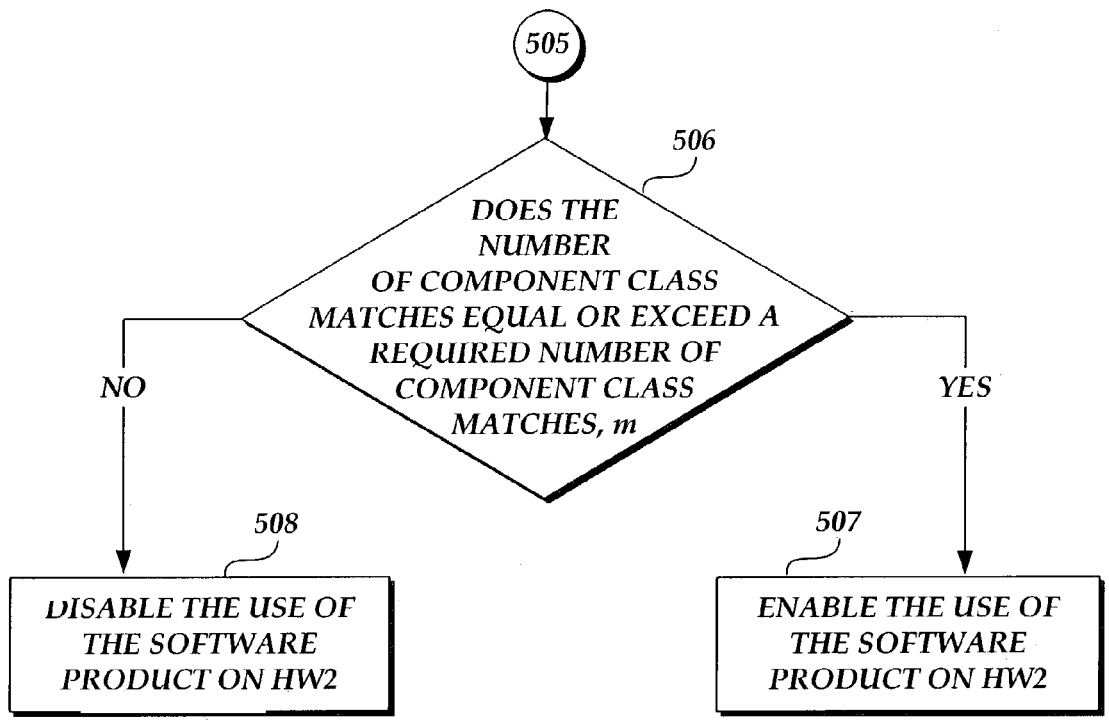

As shown in step 501 of FIG. 9, a software product is either loaded or launched on a computer having hardware configuration HW2. Computer hardware configuration HW2 (i) may be identical to hardware configuration HW1 used to produce an initial verbose hardware identification (referred to herein as iVHWID) or an initial compact hardware identification (referred to herein as iCHWID) or (ii) may be a completely different computer.

In step 502, a new compact hardware identification (referred to herein as nCHWID) is generated for computer hardware configuration HW2. The new compact hardware identification (nCHWID) for computer hardware configuration HW2 may be generated as described above and shown in FIGS. 4-8. Once a new compact hardware identification (nCHWID) is generated for computer hardware configuration HW2, a stored verbose hardware identification (VHWID) or a stored compact hardware identification (CHWID) is retrieved in step 503. Typically, the stored verbose hardware identification (VHWID) is the initial verbose hardware identification (iVHWID), which was generated on a first computer hardware configuration HW1 during an initial software product installation onto HW1. Similarly, the stored compact hardware identification (CHWID) is typically the initial compact hardware identification (iCHWID), which was generated on a first computer hardware configuration HW1 during an initial software product installation onto HW1.

In decision block 504, a determination is made whether the previously stored hardware identification is a stored compact hardware identification (CHWID). If the previously stored hardware identification is a stored compact hardware identification (sCHWID), the method proceeds to step 505, wherein the new compact hardware identification (nCHWID) of hardware configuration HW2 is compared with the previously stored compact hardware identification (sCHWID) of hardware configuration HW1. If the previously stored hardware identification is a stored verbose hardware identification (sVHWID), the method proceeds to step 509. In step 509, the new compact hardware identification (CHWID) is compared to the stored verbose hardware identification (VHWID). A second hash function is performed for each of the first hash values in each component class of the stored verbose hardware identification (VHWID) and the results compared to the second hash value associated with each component class in the new compact hardware identification (CHWID). The method then proceeds to decision block 506.

At decision block 506, a determination is made as to whether the number of component class matches equals or exceeds a required number of component class matches, m, needed to enable the use of the software product on hardware configuration HW2. If the number of component class matches equals or exceeds a required number of component class matches, m, the method proceeds to step 507, wherein the method enables the use of the software product on hardware configuration HW2. If the number of component class matches is less than the required number of component class matches, m, the method proceeds to step 508, wherein the method disables the use of the software product on hardware configuration HW2.

In step 505, the comparison of new compact hardware identification (nCHWID) of hardware configuration HW2 with (1) the previously stored compact hardware identification (CHWID) of hardware configuration HW1 or (2) the previously stored verbose hardware identification (VHWID) of hardware configuration HW1, collectively referred to herein as "the hardware identification (HWID) of hardware configuration HW1," may involve one or more rules for determining whether or not there is a match for a given component class. Desirably, the method of using a compact hardware identification (CHWID) to enable the use of a software product comprises one or more of the following rules for determining the number of component class matches between a newly generated compact hardware identification (nCHWID) for a hardware configuration HW2 and the compact hardware identification (CHWID) or verbose hardware identification (VHWID) of hardware configuration HW1:

(i) each component instance second hash result within new compact hardware identification (nCHWID) representing select component instances within one or more component classes of hardware configuration HW2 is compared with each component instance second hash result within the corresponding one or more component classes in the compact hardware identification (CHWID) or derived from the verbose hardware identification (VHWID) of hardware configuration HW1;

(ii) a match exists between a component class of hardware configuration HW2 and a corresponding component class of hardware configuration HW1 when one second component instance hash result within a component class of new compact hardware identification (nCHWID) for hardware configuration HW2 matches any one of the second component instance hash results within the corresponding component class of the compact hardware identification (CHWID) or derived from the verbose hardware identification (VHWID) of hardware configuration HW1;

(iii) a single match exists between a component class of hardware configuration HW2 and a corresponding component class of hardware configuration HW1 when one second component instance hash result within a component class used to form new compact hardware identification (nCHWID) for hardware configuration HW2 matches two or more derived second component instance hash results within a corresponding component class used to form the verbose hardware identification (VHWID) of hardware configuration HW1;

(iv) no match exists between a component class of hardware configurations HW2 and a corresponding component class of hardware configuration HW1 when the component class in hardware configuration HW2 does not contain a second component instance hash result, and the corresponding component class in hardware configuration HW1 does contain a second component instance hash result;

(v) no match exists between a component class of hardware configuration HW2 and a corresponding component class of hardware configuration HW1 when the component class in hardware configuration hardware configuration HW2 contains a single second component instance hash result, and the corresponding component class in hardware configuration HW1 does not contain a second component instance hash result; and (vi) a match exists between a component class of hardware configuration HW2 and a corresponding component class of hardware configuration HW1 when the component class in hardware configuration hardware configuration HW2 does not contain a second component instance hash result, and the corresponding component class in hardware configuration HW1 does not contain a second component instance hash result; and (vii) the number of required component classes matches, m, between hardware configuration HW2 and hardware configuration HW1 may be predetermined and embedded in code on a given software product.

The number of required component class matches, m, is chosen depending on the degree of tolerance desired for hardware configuration component changes. The number of required component class matches, m, may be (i) as great as n, the total number of component classes considered during the determination of a verbose hardware identification (VHWID), or (ii) as great as q, the total number of selected component classes considered during the determination of the compact hardware identification (CHWID), or (iii) may be as small as 1. As m increases, the degree of tolerance to computer hardware configuration changes decreases. For example, if the total number of component classes n is equal to 10 and m is equal to 7, 7 out of 10 component classes must match at least one component instance to enable the loading or running of a software product. If the number of component class matches is less than 7, the software product will not run or be loaded onto the computer hardware configuration.

The number of required component class matches, m, may be predetermined by a software manufacturer and encoded into the software product code used to generate a compact hardware identification (CHWID). In one exemplary embodiment of the present invention, m is desirably equal to (n−3). More desirably, m is equal to (n−2). In another exemplary embodiment of the present invention,m is desirably equal to (q−3). More desirably, m is equal to (q−2). However, as indicated above, m may range from 1 to n.

The method steps described above and illustrated in FIGS. 4–10 may be performed locally or at a remote location. Typically, a customer purchases a software product that can run on a given computer, such as computer 20 shown in FIG. 1. The software product may be a shrink-wrap product having a software program stored on a transportable computer-readable medium, such as a CD-ROM or floppy diskette. Alternatively, the software product may be delivered electronically over a network, such as a local area network (LAN) 51 or a wide area network (WAN) 52. The customer loads the software product onto the computer 20 as a program stored in system memory 22.

During a software product installation, the customer is typically prompted to enter a portion of the software product identification (PID) for the software product into computer 20. The PID may be derived, for example, from a CD key printed on a label of the shrink-wrap package. The customer enters the PID, which is associated with a software program of the software product. The PID is stored locally on computer 20 and/or remotely at an accessible location, either on a local area network (LAN) 51 or a wide area network (WAN) 52 with a third party, such as an activation authority.

As described above, during installation or activation of the software product, a verbose hardware identification (VHWID) and/or compact hardware identification (CHWID) is also generated using code within the software product or triggered by the installation of the software product. The verbose hardware identification (VHWID) and/or compact hardware identification (CHWID) generated by the method of the present invention is associated with the software product identification (PID) and stored along with the software product identification (PID) locally on computer 20 and/or remotely at an accessible location, either on a local area network (LAN) 51 or a wide area network (WAN) 52, such as with a third party activation authority.

As part of the installation process, the customer may be required to activate the software product with an activation authority. This authority might be, for example, the product manufacturer or an authorized third party. The activation process is intended to force the customer to activate the software product (i) for installation and use on a specific computer or (ii) for installation and use according to terms of a product licensing agreement. Such an activation process is described in detail in U.S. Pat. No. 6,243,468, assigned to Microsoft Corporation (Redmond, Wash.), the contents of which are hereby incorporated in its entirety by reference.

The verbose hardware identification (VHWID) and/or compact hardware identification (CHWID) generated by the method of the present invention and the software product identification (PID) may be stored locally on computer 20 and/or remotely at an accessible location, either on a local area network (LAN) 51 or a wide area network (WAN) 52 with an activation authority. Desirably, the software product (i) stores (a) the verbose hardware identification (VHWID) and/or compact hardware identification (CHWID) and (b) the associated software product identification (PID) on computer 20, and (ii) sends (a) the verbose hardware identification (VHWID) and/or compact hardware identification (CHWID) and (b) the associated software product identification (PID) electronically over wide area network (WAN) 52 to an activation server. Desirably, the software product automatically displays a graphical user interface (UI) dialog window when it is first launched, which prompt the user to initiate a connection with the activation server to activate. The activation server maintains a database to store (a) received verbose hardware identifications (VHWIDs) and/or compact hardware identifications (CHWIDs) and (b) the associated software product identifications (PIDs).

The verbose hardware identification (VHWID) and/or compact hardware identification (CHWID) and the associated software product identification (PID) for a given software product may be stored for an indefinite period of time until the software product is re-installed onto another computer or launched on the first computer (i.e., the computer used during the initial installation). When the same software product is re-installed onto another computer or launched on the first computer, code on the software product initiates a method of generating a new compact hardware identification (CHWID) according to the present invention. The software product also retrieves the previously stored (a) verbose hardware identification (VHWID) and/or compact hardware identification (CHWID) and (b) the associated software product identification (PID) of the software product either from local computer 20 or from a remote location via a local area network (LAN) 51 or a wide area network (WAN) 52. A comparison between the new compact hardware identification (CHWID) and the previously stored compact hardware identification (CHWID) is made as described above.

In an alternative manual case, a customer provides a service representative with a compact hardware identification (CHWID) over the phone and the service representative provides the customer with a confirmation identification (CID) based on the compact hardware identification (CHWID). The customer enters the confirmation identification (CID) via a UI window.

When the use of a software product is denied due to significant changes in the hardware configuration of a first computer (i.e., the computer used during the initial installation), a dialog box may be provided to the customer indicating that the use of the software product is being denied, and that further information regarding future use of the software product may be obtained from a given source.

III. Other Uses of A Compact Hardware Identification (CHWID)

The compact hardware identification (CHWID) of the present invention may also be used for other purposes than those described above. In one embodiment of the present invention, the compact hardware identification (CHWID) is used to create semi-unique installation ID to track the machine. In another embodiment of the present invention, the compact hardware identification (CHWID) is used on a clearinghouse server when granting licenses to use software on a customer's computer.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for generating a compact hardware identification (CHWID) for a first computer system having a first hardware configuration, wherein the method comprises:
    selecting n component classes;
    identifying component instances within each of the n component classes;
    generating a plurality of component instance first hash results, wherein the plurality of component instance first hash results comprises a first hash result for each component instance and at least one first hash result for the n component classes;
    generating a plurality of component instance second hash results, wherein the plurality of component instance second hash results comprises second bash results resulting from performing a second hash function on select component instance first hash results within at least one of the select component classes; and
    concatenating the plurality of second hash results to form a hash portion, wherein the hash portion forms the compact hardware identification (CHWID) for the first computer system.

2. The method of claim 1, further comprising:
    concatenating a version component and the hash portion of the compact hardware identification (CHWID) to form the compact hardware identification (CHWID) for the first computer system.

3. The method of claim 1, wherein n is a whole number up to 16.

4. The method of claim 2, wherein the version component comprises a version number.

5. The method of claim 1, wherein at least one of the n component classes includes at least two of the component instances.

6. The method of claim 1, wherein each of the n component classes includes between 0 and 14 component instances.

7. The method of claim 1, wherein each component instance first hash result is truncated to a 16 bit number.

8. The method of claim 1, wherein each component instance second bash result is truncated to a number having less than 8 bits.

9. The method of claim 1, wherein the compact hardware identification (CHWID) for the first computer system has a length up to 256 bits.

10. The method of claim 9, wherein the compact hardware identification (CHWID) for the first computer system has a length between 32 and 64 bits.

11. The method of claim 1, wherein the method is initiated during a step of loading a software product onto the first computer system.

12. A computing system containing at least one application module usable on the computing system, wherein the at least one application module comprises application code for performing the method of claim 1.

13. A computer readable medium having stored thereon computer-executable instructions for performing the method of claim 1.

14. A method for determining the usability of a software product on a second computer system having a second hardware configuration, the software product being initially installed on a first computer system having a first hardware configuration, wherein the method comprises:
    generating a second compact hardware identification (sCHWID) for the second hardware configuration;
    comparing the second compact hardware identification (sCHWID) for the second hardware configuration to at least one member of a group comprising: a first compact hardware identification (fCHWID) for the first hardware configuration, and a first verbose hardware identification (fVHWID) for the first hardware configuration;
    loading the software product onto the second computer system when a number of matches exists between component classes of the second hardware configuration and corresponding component classes of the first hardware configuration, and the number of matches equals or exceeds m required component class matches; and
    preventing the software product from being loaded onto the second computer system when the number of matches is less than m.

15. The method of claim 14, wherein the second compact hardware identification (sCHWID) is generated by a method comprising:
    selecting n component classes of the second hardware configuration;
    identifying component instances within each of the n component classes of the second hardware configuration;
    generating a plurality of component instance first hash results, wherein the plurality of component instance first hash results comprises a first hash result for each component instance and at least one first hash result for the n component classes of the second hardware configuration;
    generating a plurality of component instance second bash results, wherein the plurality of component instance second hash results comprises second hash results resulting from performing a second hash function on select component instance first hash results within at least one of the select component classes of die second hardware configuration; and
    concatenating the plurality of second hash results to form a hash portion, wherein the hash portion forms the second compact hardware identification (sCHWID) for the second hardware configuration.

16. The method of claim 14, wherein the first compact hardware identification (fCHWID) is generated by a method comprising:
    selecting n component classes of the first hardware configuration;
    identifying component instances within each of the n component classes of the first hardware configuration;

generating a plurality of component instance first hash results, wherein the plurality of component instance first hash results comprises a first hash result for each component instance and at least one first bash result for the n component classes of the first hardware configuration;

generating a plurality of component instance second hash results, wherein the plurality of component instance second hash results comprises second hash results resulting from performing a second hash function on select component instance first hash results within at least one of the select component classes of the first hardware configuration; and concatenating the plurality of second hash results to form a hash portion, wherein the hash portion forms the first compact hardware identification (fCHWID) for the first hardware configuration.

17. The method of claim 14, wherein the first verbose hardware identification (fVHWID) is generated by a method comprising:

selecting n component classes of the first hardware configuration;

identifying component instances within each of the n component classes of the first hardware configuration;

generating a plurality of component instance first hash results, wherein the plurality of component instance first hash results comprises a first hash result for each component instance and at least one first hash result for the n component classes of the first hardware configuration; and concatenating the plurality of first hash results to form a hash portion, wherein the hash portion forms the first verbose hardware identification (fVHWID) for the first hardware configuration.

18. The method of claim 14, wherein a match exists between a component class of the second hardware configuration and a corresponding component class of the first hardware configuration when one second component instance hash result within a component class of the second compact hardware identification (sCHWID) for the second hardware configuration matches one of the second component instance hash results within a corresponding component class of at least one member of a group comprising: the first compact hardware identification (fCHWID) for the first hardware configuration, and derived from the first component instance bashes of the verbose hardware identification (fVHWID) for the first hardware configuration.

19. The method of claim 14, wherein a single match exists between a component class of the second hardware configuration and a corresponding component class of the first hardware configuration when one second component instance hash result within a component class of the second compact hardware identification (sCHWID) for the second hardware configuration matches at least two second component instance hash results derived from the first component instance hashes within a corresponding component class of the first verbose hardware identification (fVHWID) for the first hardware configuration.

20. The method of claim 14, wherein no match exists between a component class of the second hardware configuration and a corresponding component class of the first hardware configuration when the component class in the first hardware configuration does not contain a component instance and the corresponding component class in the second hardware configuration does contain a component instance, and when the component class in the first hardware configuration contains a single component instance and the corresponding component class in the second hardware configuration does not contain a component instance.

21. The method of claim 14, wherein a match exists between a component class of the second hardware configuration and a corresponding component class of the first hardware configuration when the component class in the first hardware configuration does not contain a component instance, and the corresponding component class in the second hardware configuration does not contain a component instance.

22. The method of claim 14, wherein m equals (n−3), wherein n represents the number of component classes within the second hardware configuration used to farm the second compact hardware identification (sCHWID).

23. A computing system containing at least one application module usable on the computing system, wherein the at least one application module comprises application code for performing the method of claim 14.

24. A computer readable medium having stored thereon computer-executable instructions for performing the method of claim 14.

25. A computer readable medium having stored thereon computer-executable instructions for performing a method for generating a compact hardware identification (CHWID) for a first computer system having a first hardware configuration, wherein the method comprises:

selecting n component classes;

identifying component instances within each of the n component classes;

generating a plurality of component instance first hash results, wherein the plurality of component instance first hash results comprises a first hash result for each component instance and at least one first hash result for the ii component classes;

generating a plurality of component instance second hash results, wherein the plurality of component instance second hash results comprises second bash results resulting from performing a second hash function on select component instance first hash results within at least one of the select component classes; and concatenating the plurality of second bash results to form a hash portion, wherein the hash portion forms the compact hardware identification (CHWID) for the first computer system.

26. The computer readable medium of claim 25, further comprising:

concatenating a version component and the hash portion of the compact hardware identification (CHWID) to form the compact hardware identification (CHWID) for the first computer system.

27. The computer readable medium of claim 25, wherein n is a whole number up to 16.

28. The computer readable medium of claim 26, wherein the version component comprises a version number.

29. The computer readable medium of claim 25, wherein at least one of the n component classes includes at least two component instances.

30. The computer readable medium of claim 25, wherein each of the n component classes includes between 0 and 14 component instances.

31. The computer readable medium of claim 25, wherein the compact hardware identification (CHWID) for the first computer system has a length up to 256 bits.

32. The computer readable medium of claim 25, wherein the method is initiated during a step of loading a software product onto the first computer system.

33. A computer readable medium having stored thereon computer-executable instructions for performing a method for determining the usability of a software product on a second computer system having a second hardware configuration, the software product being initially installed on a first computer system having a first hardware configuration, wherein the method comprises:

generating a second compact hardware identification (sCHWID) for the second hardware configuration;

comparing the second compact hardware identification (sCHWID) for the second hardware configuration to at least one member of a group, comprising: a first compact hardware identification (fCHWID) for the first hardware configuration, and a first verbose hardware identification (fVHWID) for the first hardware configuration;

loading the software product onto the second computer system when a number of matches exists between component classes of the second hardware configuration and corresponding component classes of the first hardware configuration, and the number of matches equals or exceeds m required component class matches; and preventing the software product from being loaded onto the second computer system when the number of matches is less than m.

34. The computer readable medium of claim 33, wherein the second compact hardware identification (sCHWID) is generated by a method comprising:

selecting n component classes of the second hardware configuration;

identifying component instances within each of the n component classes of the second hardware configuration;

generating a plurality of component instance first bash results, wherein the plurality of component instance first hash results comprises a first hash result for each component instance and at least one first hash result for the n component classes of the second hardware configuration;

generating a plurality of component instance second hash results, wherein the plurality of component instance second bash results comprises second hash results resulting from performing a second hash function on select component instance first hash results within at least one of the select component classes of the second hardware configuration; and concatenating the plurality of second hash results to form a hash portion, wherein the hash portion forms the second compact hardware identification (sCHWID) for the second hardware configuration.

35. The computer readable medium of claim 33, wherein the first compact hardware identification (fCHWID) is generated by a method comprising:

selecting n component classes of the first hardware configuration;

identifying component instances within each of the n component classes of the first hardware configuration;

generating a plurality of component instance first hash results, wherein the plurality of component instance first hash results comprises a first hash result for each component instance and at least one first hash result for the n component classes of the first hardware configuration;

generating a plurality of component instance second hash results, wherein the plurality of component instance second hash results comprises second hash results resulting from performing a second hash function on select component instance first hash results within at least one of the select component classes of the first hardware configuration; and concatenating the plurality of second hash results to form a hash portion, wherein the hash portion forms the first compact hardware identification (fCHWID) for the first hardware configuration.

36. The computer readable medium of claim 33, wherein the first verbose hardware identification (fVHWID) is generated by a method comprising:

selecting n component classes of the first hardware configuration;

identifying component instances within each of the n component classes of the first hardware configuration;

generating a plurality of component instance first hash results, wherein the plurality of component instance first hash results comprises a first hash result for each component instance and at least one first hash result for the n component classes of the first hardware configuration; and concatenating the plurality of first hash results to form a hash portion, wherein the hash portion forms the first verbose hardware identification (fVHWID) for the first hardware configuration.

37. The computer readable medium of claim 33, wherein a match exists between a component class of the second hardware configuration and a corresponding component class of the first hardware configuration when one second component instance hash result within a component class of the second compact hardware identification (sCHWID) for the second hardware configuration matches one of the second component instance hash results within a corresponding component class of at least one member of a group comprising: the first compact hardware identification (fCHWID) for the fast hardware configuration, and derived from the first component instance hashes of the verbose hardware identification (fVHWID) for the first hardware configuration.

38. The computer readable medium of claim 33, wherein a single match exists between a component class of the second hardware configuration and a corresponding component class of the first hardware configuration when one second component instance hash result within a component class of the second compact hardware identification (sCHWID) for the second hardware configuration matches at least two second component instance hash results derived from the first component instance hashes within a corresponding component class of the first verbose hardware identification (fVHWID) for the first hardware configuration.

39. The computer readable medium of claim 33, wherein no match exists between a component class of the second hardware configuration and a corresponding component class of the first hardware configuration when the component class in the first hardware configuration does not contain a component instance and the corresponding component class in the second hardware configuration does contain a component instance, and when the component class in the first hardware configuration contains a single component instance and the corresponding component class in the second hardware configuration does not contain a component instance.

40. The method of claim 33, wherein a match exists between a component class of the second hardware configuration and a corresponding component class of the first hardware configuration when the component class in the first hardware configuration does not contain a component instance, and the corresponding component class in the second hardware configuration does not contain a component instance.

41. The computer readable medium of claim 33, wherein m equals (n−3), wherein n represents the number of component classes within the second hardware configuration used to form die second compact hardware identification (sCHWID).

42. A computing system including at least one application module usable on the computing system, wherein the at least one application module comprises application code for performing a method of generating a compact hardware identification (CHWID) for a first computer system having a first hardware configuration, wherein the method comprises:
    selecting n component classes;
    identifying component instances within each of the n component classes;
    generating a plurality of component instance first hash results, wherein the plurality of component instance first hash results comprises a first hash result for each component instance and at least one first hash result for the n component classes;
    generating a plurality of component instance second hash results, wherein the plurality of component instance second hash results comprises second hash results resulting from performing a second bash function on select component instance first bash results within at least one of the select component classes; and
    concatenating the plurality of second bash results to form a hash portion, wherein the hash portion forms the compact hardware identification (CHWID) forte first computer system.

43. The computing system of claim 42, further comprising:
    concatenating a version component and the hash portion of the compact hardware identification (CHWID) to form the compact hardware identification (CHWID) for the first computer system.

44. The computing system of claim 42, wherein n is a whole number up to 16.

45. The computing system of claim 43, wherein the version component comprises a version number.

46. The computing system of claim 42, wherein at least one of the n component classes includes at least two component instances.

47. The computing system of claim 42, wherein each of the n component classes includes between 0 and 14 component instances.

48. The computing system of claim 42, wherein the compact hardware identification (CHWID) for the first computer system has a length up to 256 bits.

49. The computing system of claim 42, wherein the method is initiated during a step of loading a software product onto the first computer system.

50. A computing system including at least one application module usable on the computing system, wherein the at least one application module comprises application code for performing a method for determining the usability of a software product on a second computer system having a second hardware configuration, the software product being initially installed on the first computer system having a first hardware configuration, wherein the method comprises:
    generating a second compact hardware identification (sCHWID) for the second hardware configuration;
    comparing the second compact hardware identification (sCHWID) for the second hardware configuration to at least one member of a group comprising: a first compact hardware identification (fCHWID) for the first hardware configuration, and a first verbose hardware identification (fVHWID) for the first hardware configuration;
    loading the software product onto the second computer system when a number of matches exists between component classes of the second hardware configuration and corresponding component classes of the first hardware configuration, and the number of matches equals or exceeds m required component class matches; and
    preventing the software product from being loaded onto the second computer system when the number of matches is less than m.

51. The computing system of claim 50, wherein the second compact hardware identification (sCHWID) is generated by a method comprising:
    selecting n component classes of the second hardware configuration;
    identifying component instances within each of the n component classes of the second hardware configuration;
    generating a plurality of component instance first hash results, wherein the plurality of component instance first hash results comprises a first hash result for each component instance and at least one first hash result for the n component classes of the second hardware configuration;
    generating a plurality of component instance second hash results, wherein the plurality of component instance second hash results comprises second bash results resulting from performing a second hash function on select component instance first hash results within at least one of the select component classes of the second hardware configuration; and
    concatenating the plurality of second hash results to form a hash portion, wherein the hash portion forms the second compact hardware identification (sCHWID) for the second hardware configuration.

52. The computing system of claim 50, wherein the first compact hardware identification (fCHWID) is generated by a method comprising:
    selecting n component classes of the first hardware configuration;
    identifying component instances within each of the n component classes of the first hardware configuration;
    generating a plurality of component instance first hash results, wherein the plurality of component instance first hash results comprises a first hash result for each component instance and at least one first hash result for the n component classes of the first hardware configuration;
    generating a plurality of component instance second bash results, wherein the plurality of component instance second hash results comprises second hash results resulting from performing a second hash function on select component instance first hash results within at least one of the select component classes of the first hardware configuration; and
    concatenating the plurality of second hash results to form a hash portion, wherein the hash portion forms the first compact hardware identification (fCHWID) for the first hardware configuration.

53. The computing system of claim 50, wherein the first verbose hardware identification (fVHWID) is generated by a method comprising:

selecting n component classes of the first hardware configuration;

identifying component instances within each of the n component classes of the first hardware configuration;

generating a plurality of component instance first hash results, wherein the plurality of component instance first hash results comprises a first hash result for each component instance and at least one first hash result for the n component classes of the first hardware configuration; and concatenating the plurality of first hash results to form a hash portion, wherein the hash portion forms the first verbose hardware identification (fVHWID) for the first hardware configuration.

54. The computing system of claim 50, wherein a match exists between a component class of the second hardware configuration and a corresponding component class of the first hardware configuration when one second component instance hash result within a component class of the second compact hardware identification (sCHWID) for the second hardware configuration matches one of the second component instance hash results within a corresponding component class of at least one member of a group comprising: the first compact hardware identification (fCHWID) for the first hardware configuration, and derived from the first component instance hashes of the verbose hardware identification (fVHWID) for the first hardware configuration.

55. The computing system of claim 50, wherein a single match exists between a component class of the second hardware configuration and a corresponding component class of the first hardware configuration when one second component instance hash result within a component class of the second compact hardware identification (sCHWID) for the second hardware configuration matches at least two second component instance hash results derived from the first component instance hashes within a corresponding component class of the first verbose hardware identification (fVHWID) for the first hardware configuration.

56. The computing system of claim 50, wherein no match exists between a component class of the second hardware configuration and a corresponding component class of the first hardware configuration when the component class in the first hardware configuration does not contain a component instance and the corresponding component class in the second hardware configuration does contain a component instance, and when the component class in the first hardware configuration contains a single component instance and the corresponding component class in the second hardware configuration does not contain a component instance.

57. The method of claim 50, wherein a match exists between a component class of the second hardware configuration and a corresponding component class of the first hardware configuration when the component class in the first hardware configuration does not contain a component instance, and the corresponding component class in the second hardware configuration does not contain a component instance.

58. The computing system of claim 50, wherein in equals (n−3), wherein n represents the number of component classes within the second hardware configuration used to form the second compact hardware identification (sCHWID).

* * * * *